(12) United States Patent
Schön

(10) Patent No.: US 6,799,687 B1
(45) Date of Patent: Oct. 5, 2004

(54) SYSTEM AND METHOD FOR LINEAR OBJECT REALLOCATION IN PLACE

(75) Inventor: Otmar Schön, Bexbach-Höchen (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 82 days.

(21) Appl. No.: 10/130,722

(22) PCT Filed: Nov. 17, 2000

(86) PCT No.: PCT/EP00/11419
§ 371 (c)(1),
(2), (4) Date: Aug. 20, 2002

(87) PCT Pub. No.: WO01/37965
PCT Pub. Date: May 31, 2001

(30) Foreign Application Priority Data

Nov. 25, 1999 (DE) .......................................... 199 56 859

(51) Int. Cl.[7] .......................... B01D 29/35; B01D 29/52; B01D 29/68; B01D 35/26
(52) U.S. Cl. ...................... 210/411; 210/333.1; 210/412
(58) Field of Search .................................. 210/411, 412, 210/333.1, 108

(56) References Cited

U.S. PATENT DOCUMENTS 3,445,002 A * 5/1969 Muller ....................... 210/108
4,462,916 A    7/1984 Ecabert et al.
4,666,592 A    5/1987 Bea
5,011,023 A    4/1991 Arai

FOREIGN PATENT DOCUMENTS

| DE | 3934947 A1 | * 5/1991 | .......... B01D/29/62 |
|----|------------|----------|----------------------|
| DE | 4312731    | 11/1994  |                      |
| DE | 19608104   | 10/1997  |                      |
| EP | 218034     | 4/1987   |                      |
| WO | 9842426    | 10/1998  |                      |

* cited by examiner

Primary Examiner—Thomas M. Lithgow
(74) Attorney, Agent, or Firm—Roylance, Abrams, Berdo & Goodman L.L.P.

(57) ABSTRACT

A backflush filter device for filter elements (22) is incorporated in a filter housing (10) having a filter inlet (18) and an outlet (20) for the liquid to be filtered. The filter elements (22) permit flow in both directions for a filtration, or backflush. One filter element (22) may be performing a filtration and, simultaneously, at least one other filter element (22) may be backflushed to clean its effective filtration surface. To assist the backflushing, a vacuum device (42) is provided. The vacuum device generates a vacuum at the filter element (22) to be backflushed. The efficacy of the ongoing backflush is increased to be able to remove even the toughest contaminants. The cleaning process uses little energy and occurs in a defined manner, such that the backflush volumes may be both specified and minimized.

11 Claims, 1 Drawing Sheet

SYSTEM AND METHOD FOR LINEAR OBJECT REALLOCATION IN PLACE

FIELD OF THE INVENTION

The present invention relates to a backflush filter device having a filter housing with an inlet and an outlet, which can filter fluid passing through its filter elements and can be cleaned by backflushing.

BACKGROUND OF THE INVENTION

A backflush filter device is disclosed in WO 98/42426. In this conventional backflush filter, part of the elements employed are conical in shape, particularly in the form of slit screen tube filter elements. Because of the conical construction, the spacing between the individual slit screen tube filter elements or between those elements and cylindrical filter elements is increased. This increased spacing causes the exit stream in the filter housing also to be increased. Consequently, the discharge resistance in filter operation is lowered. The reason for this lowering of the discharge resistance is primarily the relatively larger exit cross-section of the conical filter elements in comparison to cylindrical elements with the filter surface being the same. Since the exit cross-section in the case of conical filter elements is relatively small in comparison to the entrance cross-section formed by the filter surface (that is, the free element surface), a bottleneck is formed in which a large part of the system pressure drops as a function of the magnitude of the flow resistance of the slit tube. Consequently, smaller pressure losses occur. This smaller pressure is more favorable from the viewpoint of energy conservation in the case of backflushing.

In the case of backflushing, a large part of the throughput volume is obtained more or less at the lower end of the filter with conical and cylindrical filter elements. The volume streams then decrease very quickly. Since the conical element is backflushed substantially farther, the velocity gradient is also less steep. An additional cleaning effect in comparison to cylindrical elements is achieved as a result of element conicity when the velocity profiles relative to the filter surface are included. The more or less constant velocity achieved in cleaning the conical filter elements makes the cleaning less harsh, and increases the service life of the filter elements involved.

Preferably, all filter elements are regenerated in succession in backflushing. During filtration of individual elements, filtration by way of the remaining slit tubes continues. The filtration operation is not interrupted at any time. The excess pressure occurring in the backflush filter device allows a small partial stream of the filter element to be cleaned to flow in the opposite direction during the backflush stage, the fouling being separated from the element and carried away. The amount drained in conjunction with backflushing cannot be measured with precision and is based on empirical values. As a general rule large amounts are backflushed over longer periods in order to ensure defouling. Pressure losses occur in backflushing of this nature, and these pressure losses reduce defouling efficiency.

EP-A-0218 034 discloses a device for cleaning porous filter plates which are accessible from both sides and are used for filtration in open basins or channels. These filter plates are cleaned when required by a device which can be moved back and forth. The device has spray nozzles on the side of the clean medium and a suction pipe on the side of the fouled medium. A special vacuum case surrounds the spray nozzles and is under vacuum during operation. The dirt particles stirred up by the spray nozzles are constantly withdrawn; and the clean medium is also not fouled during cleaning operation. The corresponding conventional solution absolutely requires a direct engagement of the porous filter plate involved, so that it is not suitable for use in backflush filter devices.

U.S. Pat. No. 4,462,916 discloses a generic backflush filter device with a suction pump serving as vacuum device for sustaining the backflush. This vacuum device continuously generates a vacuum on the respective filter element to be backflushed, and thus, defouls it. The suction force to be applied by the pump is uniformly generated and depends on the performance of the pump. The impurities drawn off by the hydraulic pump are transferred to a discharge device on its discharge side, one which performs disposal outside the filter device. Because of the continuous pumping operation, the energy cost for defouling of the filter element in question is correspondingly high. In addition, the suction capacity is, as a rule, not adequate for removing especially persistent fouling.

Accordingly, DE-C-196 08 04 discloses pressure pulse backflushing of filters, cross-current filters in particular, by means of a flushing medium. The flushing medium in question is stored in at least one hydraulic accumulator which performs the backflushing by means of a pressure pulse. The respective hydraulic accumulator is connected on its gas side to an operating device which delivers the priming gas pressure on the gas side of the respective hydraulic accumulator. Priming of the accumulator with a fluid, water in particular, delivered by the operating device, is also possible as an alternative. In the case of the conventional pressure pulse backflushing, the fouling to be removed is flushed in the direction of the retained matter side of the filter. This removal is not harmful with cross-current filters, but would not lead to useful results with generic backflush filter devices, since the clean side with the filtrate would then be fouled by the fouling removed from the respective backflushed filter element.

SUMMARY OF THE INVENTION

Objects of the present invention are to provide a backflush filter device with intensified backflushing removing even the most persistent fouling, and with a defouling process which is more energy-efficient and more definite.

As a result of a vacuum device having a hydraulic accumulator with an imperious separating element, and of the separating element of the hydraulic accumulator being connected to an operating device for suction or pumping movement, measured defouling with prescribed backflushing amounts takes place. The backflushing is intensified by the vacuum of the vacuum device applied in the form of the hydraulic accumulator. Consequently, as a result of use of the hydraulic accumulator, even with low system pressures and thus with increased energy efficiency, persistent fouling of the active filter surface of the filter element can be removed and discharged from the filter device. Support of backflushing by the hydraulic accumulator is effected for both cylindrical and conical filter elements.

The backflush amount is defined by the volume capacity of the hydraulic accumulator. Through the connection of the separating element to the operating device, the separating element may be actuated so that a pulsed vacuum impact on the filter element to be defouled is generated. This pulsed vacuum impact contributes to removal of persistent fouling, and accordingly, to an increase in defouling efficiency.

In a preferred embodiment of the backflush filter device of the present invention, an actuatable flushing arm is provided for the backflushing. The arm has a fluid discharge for fouled fluid and may be traversed among the free inlet cross-sections of the filter elements in succession. In this way, a filter element may be driven definitely over the flushing arm from other filtration operation with the other filter elements for a backflush process. In addition, the corresponding layout is structurally compact and can be accommodated in one overall filter housing to conserve space. Preferably, the vacuum device is connected to the fluid outlet of the flushing arm.

Especially good results can be achieved in backflushing if a diaphragm accumulator is used as the hydraulic accumulator.

The separating element of the hydraulic accumulator is then connected to the operating device in the form of a working cylinder for suction or pumping movement. In the case of pumping movement, the fouled fluid drawn into the hydraulic accumulator is moved to the exterior, preferably by way of a discharge device. The fluid discharge element is closed off by a sealing element during the discharge process. The vacuum device designed for this purpose may be cost effectively produced.

In a preferred embodiment of the backflush filter device of the present invention, the operating device may be actuated by a valve unit. The sealing element is in the form of a return valve which opens in the direction of the hydraulic accumulator. The operating device may be driven by compressed air, hydraulic means, or electrically.

In another preferred embodiment of the backflush filter of the present invention, the intake volume of the hydraulic accumulator is adapted to the passage volume of the amount of fluid provided for backflushing of the filter element involved. In this manner, complete defouling supported by the vacuum device takes place.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

Detailed Description Of The Invention

Figure 1:
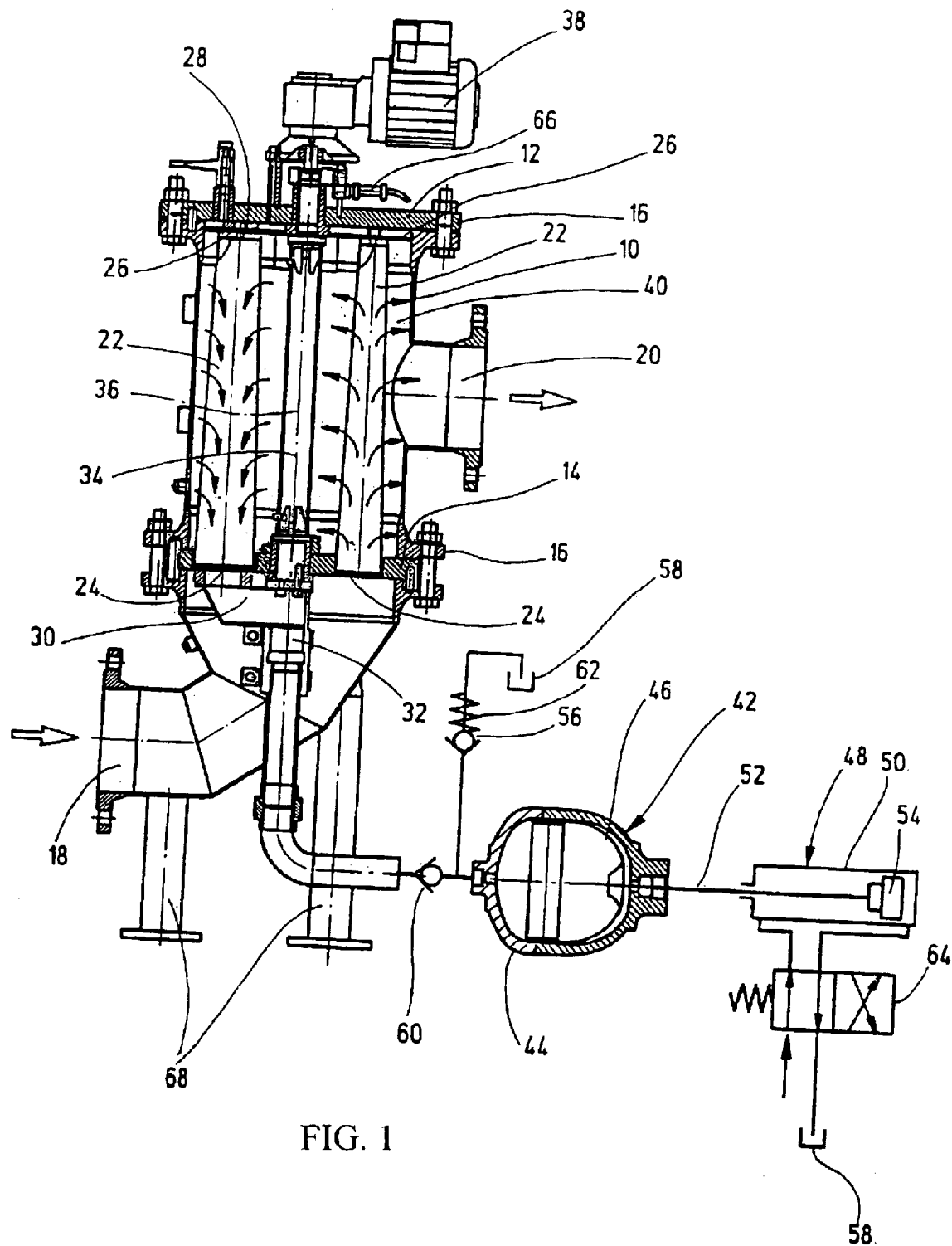
FIG. 1 is a side elevational view partially in section of a backflush filter device according to an embodiment of the present invention, which is not to scale.

The backflush filter device shown has a cylindrical housing 10 with two closing covers 12 and 14 fastened by flange connections 16 on the filter housing 10. The filter housing 10 of the backflush filter device has a filter inlet 18 for the fluid to be filtered and a filter outlet 20 for the filtered fluid. The direction of fluid through the housing 10 in the filtering operation is indicated in FIG. 1 by corresponding arrows at the filter inlet 18 and on the filter outlet 20.

Filter elements 22 extend conically upward in the filter device. The conical filter elements 22 may be replaced, at least in part, by cylindrical filter elements (not shown). The conical filter elements 22 in question, which may comprise slit screen tubular elements, are mounted so as to be spaced at intervals along a cylindrical arc inside the filter housing 10. In an embodiment not shown in detail, the filter elements 22 may also be subdivided into multiple groups mounted along cylindrical arcs.

The filter elements 22 shown in FIG. 1 discharge with their inlet cross-section 24, that is, with their free opening, into corresponding cylindrically shaped recesses in the lower sealing cover 14. At their opposite ends, the filter elements 22 are provided with sealing caps 26 retaining the filter elements 22 on an adapter 28. The adapter comes into contact with the sealing cover 12 moving from above.

A drivable flushing arm 30 is provided on the backflush filter device at its bottom. Flushing arm 30 has a connection in the form of a fluid discharge 32 for fouled fluid for the actual backflushing. The flushing arm 30 allows the filter elements 22 to be transported in succession among the inlet cross-sections 24 by a drive rod 34. The backflushing proceeds continuously and simultaneously with the actual filtration process. The filter elements 22 being backflushed have flow from the exterior toward the interior of the filtered fluid cleaned by the other filter elements 22 during filtration. The free inlet cross-sections 24 of the backflushing filter elements are swept from below in succession by the flushing arm 30. The backflush direction is indicated by arrows pointing inward. The usual filtration direction is indicated by arrows pointing outward. If the filter elements 22 are arranged in groups along a plurality of arcs inside the filter housing 10, the flushing arm 30 requires an additional arm section of varying length by which the additional group of filter elements 22 can be swept on the side of its inlet cross-section 24.

The fluid fouled during backflushing is discharged through the tubular fluid discharge 32. Drive rod 34 extends along the longitudinal axis 36 of the backflush device through filter housing 10 and extends through both the upper sealing cover 12 and the lower sealing cover 14. For propulsion of the drive rod 34, especially in the form of a hollow shaft, a splined shaft connection (not shown) is provided for the drive rod 34 to be driven by an electric motor 38 for rotation about the longitudinal axis 36.

The filter inlet 18, is from its external wall inward, in the form of a diffusor which reduces the fluid inlet rate of the fouled fluid to be filtered simultaneously with rise in pressure on the inlet cross-sections 24 of the conical filter elements 22 cleared by the flushing arm 30. The diffusor action is favored in particular by the circumstance that the inlet cross-sections on the filter inlet 18 and the cross-section of the reception space 40 are more or less the same, and the transition from filter inlet 18 to reception space 40 is made more or less uniformly with no reduction in cross-section.

Because of the conical structure of the filter elements 22, the transmission surface in the respective element is very large. The spacing of the conical elements 22 in the direction of the filter outlet 20 is increased, so that the filtered fluid encounters lower resistance on emerging from the interior of the filter element 22 involved compared to conventional solutions with exclusively cylindrical elements. In addition, a constant flow of fluid in backflushing of the elements is achieved as a result of the conical design of the filter elements 22. A vacuum device, identified as a whole as 42, is present for support of this backflushing. That device generates a vacuum or suction effect on the given filter element 22 to be backflushed. This effect will be discussed in greater detail in the following.

The vacuum device 42 is connected to the fluid discharge 32 of the flushing arm 30 for better defouling. The vacuum device 42 has a hydraulic accumulator with separating element. In the present embodiment, a diaphragm accumulator 44 is employed as the hydraulic accumulator. The accumulator has an impervious or nonporous separating element 46 in the form of a separating membrane movable back and forth inside the diaphragm accumulator 44, more or less impermeable to gas and fluid, and formed in particular of a rubber material. The separating element 46 of the diaphragm accumulator 44 is connected to an operating mechanism or actuator 48 for generation of a suction or pumping movement.

The operating device 48 has a conventional working cylinder 50. The piston rod 52 of the cylinder extends through the housing of the diaphragm accumulator 44 and is sealed. The free end of the piston rod 52 is rigidly connected to the base of the separating element 46. If the piston 54 of the working cylinder 50 is extended, that is, moves in the line of sight in the figure, from its illustrated position, into its left operating position, it also carries the separating membrane with it by way of the piston rod 52. In this manner, the accumulator executes a pumping movement. In the opposite direction of movement, a suction process then takes place for the vacuum device 42. As the elastic separating element 46 moves back and forth, it is bounded by the inside of the housing, which forms stops for this purpose. On its end opposite the piston rod 52, the diaphragm accumulator 44 is connected to the fluid discharge 32 to conduct fluid. In principle, a conventional diaphragm accumulator 42 may be employed, and performs its function as vacuum device 42 without major structural modifications.

An output device 56 is inserted in the side branch in the fluid-conducting connection between diaphragm accumulator 44 and fluid discharge 32. The fouled fluid drawn into the diaphragm accumulator 44, can be discharged to the exterior by this output device 56 by the pumping movement. During the accompanying output process, preferably at a tank 58, the fluid discharge 32 is closed by a closing element 60 in the form of a simple return valve. The return valve used as closing element 60 opens in the direction of the diaphragm accumulator 44 and closes in the direction of the fluid discharge 32. During the closing movement, the closing element 60 is closed, and the fouled fluid stored in the diaphragm accumulator 44 is conveyed to the tank 58 by the output device 56, by a spring-loaded return valve 62 being activated. The return valve 62 opens in the direction of the tank 58 and is brought into its closed position under the action of its spring.

The operating mechanism 48 can be actuated by a valve unit 64 in the form of a conventional 2/2-way pilot valve. Actuation by the valve unit 64 can be effected by hydraulic or pneumatic means. Direct electromechanical actuation (not shown) of the piston 54 of the working cylinder 50 is also possible. Actuation by a control unit (not shown) of the vacuum mechanism 42 is effected in that, as soon as the flushing arm 30 has moved under the filter element 22 to be flushed, the vacuum device 42 begins the suction process, in which the separating element 46 is brought by the operating mechanism 48 from its left stop operating position into the right stop position. The piston 54 of the working cylinder 50 moves into place and assumes its end position, as illustrated in the FIG. 1. The return movement may be pulsed, so that the vacuum mechanism 42 generates a vacuum stroke on the filter element 22 to be flushed, so that even the most persistent fouling can be instantly removed.

If the hydraulic accumulator has been filled with defouled fluid and the flushing arm 30 moved to its next filter element 22 to be defouled, the process of movement of the flushing arm 30 is used to transport the fouled fluid from the hydraulic or diaphragm accumulator 44 by way of the output device 56. In this instance the separating element 46 is moved in the pumping mode by the operating device 48 from its right position shown in FIG. 1, back to the left most pumping position. The hydraulic accumulator is then again available for a defouling process. Actuation for this purpose may be carried out on the basis of a monitoring device 66 which monitors the position of the drive rod 34 for the flushing arm 30. As a function of the actuation position of the flushing arm 30, the monitoring device 66 causes operation of the valve unit 64 by way of the control unit (not shown), and thus, determines the operating position of the working cylinder 50 of the operating device 48.

For a good defouling effect, the initial volume of the hydraulic accumulator is adjusted to the volume of passage of the amount of fluid provided for backflushing of a particular filter element 22. In place of the illustrated diaphragm accumulator 44, another hydraulic accumulator, such as a plunger-type accumulator, could be used. The backflush filter device may be installed as an integral component in overall fluid devices, or may be mounted separately, for example, by means of columns 68 as shown in the figure.

The backflush filter device of the present invention also permits automatic defouling of fouled filter elements, without the need for interruption of actual filtration operation. The backflush filter device is well-suited, in particular for separation of solids from low-viscosity liquids. In such process, defouling of a particular filter element in the form of backflushing by the vacuum device illustrated is improved.

The backflush filter device of the present invention also makes it possible to reduce and define the backflush volume required. This is especially important for production flows. The quantifiable backflush volume can be prescribed by the path of movement of the separating element 46 and set by way of the operating device 48. It is possible in particular to minimize the backflush volumes to a great extent. This minimization benefits other elements of filtration operation.

While one embodiment has been chosen to illustrate the invention, it will be understood by those skilled in the art that various changes and modifications can be made therein without departing from the scope of the invention as defined in the appended claims.

What is claimed is:

1. A backflush filter device, comprising:
   a filter housing having a filter inlet and a filter outlet;
   a plurality of filter elements mounted in said filter housing and allowing fluid flow in both directions therethrough for filtering and backflushing, respectively;
   a vacuum device selectively in fluid communication with the respective filter elements to assist backflushing thereof, said vacuum device including a hydraulic accumulator with an impervious separator therein; and
   an actuator connected to said separator to move said separator for generating suction and pumping pressures thereby;
   whereby, at least one of said filter elements can be backflushed to clean an effective filtering surface thereof, while at least one other of said filter elements can perform a filtering operation.

2. A backflush filter device according to claim 1 wherein said vacuum device is selectively in fluid communication with the respective filter elements through an actuatable flushing arm, said flushing arm having a fluid discharge for fouled fluid and being movable under free inlet cross sections of said filter elements in succession.

3. A backflush filter device according to claim 2 wherein said vacuum device is connected to said fluid discharge of said flushing arm.

4. A backflush filter device according to claim 1 wherein said hydraulic accumulator is a diaphragm accumulator.

5. A backflush filter device according to claim 4 wherein said actuator is a fluid operated piston and cylinder.

6. A backflush filter device according to claim 5 wherein said hydraulic accumulator is in fluid communication with an output device when generating the pumping pressure to pump fouled fluid drawn into said hydraulic accumulator exteriorily of the filter device through said output device; and a closing element is located between a fluid discharge adjacent the respective filter element being backflushed and said hydraulic accumulator to close a conduit therebetween when fouled fluid is discharged from said hydraulic accumulator during generation of the pumping pressure.

7. A backflush filter device according to claim 6 wherein said actuator is coupled to and controlled by a valve unit; and said closing element comprises a return valve opening toward said hydraulic accumulator.

8. A backflush filter device according to claim 1 wherein said filter elements are conical.

9. A backflush filter device according to claim 1 wherein said filter elements are slit screen tube filter elements.

10. A backflush filter device according to claim 1 wherein said hydraulic accumulator has an intake volume substantially equal to an amount of fluid for backflushing one of said filter elements.

11. A backflush filter device according to claim 1 wherein said vacuum device generates pulsating suction pressures.

* * * * *